(12) United States Patent
Speer et al.

(10) Patent No.: US 7,600,774 B1
(45) Date of Patent: Oct. 13, 2009

(54) CAM ACTION TIGHTENING RECEIVER HITCH ASSEMBLY

(76) Inventors: William W. Speer, 1323 Eleanor Way, Sunnyvale, CA (US) 94087; W. Louis Speer, 1323 Eleanor Way, Sunnyvale, CA (US) 94087

( * ) Notice: Subject to any disclaimer, the term of this patent is extended or adjusted under 35 U.S.C. 154(b) by 294 days.

(21) Appl. No.: 11/784,329

(22) Filed: Apr. 6, 2007

(51) Int. Cl.
B60D 1/04 (2006.01)
B60D 1/155 (2006.01)
E04B 9/16 (2006.01)

(52) U.S. Cl. .................. 280/506; 280/493; 403/387

(58) Field of Classification Search ......... D25/119, D25/122, 124, 126, 133, 164; 52/244, 831, 52/839, 843; 403/204, 270, 271, 272, 286, 403/341, 345, 363, 376, 377, 378, 387, 402; 224/402, 428, 519, 520, 521, 537, 551; 280/490.1, 280/493, 506, 507; 228/101, 165, 167

See application file for complete search history.

(56) References Cited

U.S. PATENT DOCUMENTS

| | | | | |
|---|---|---|---|---|
| 2,054,800 A | * | 9/1936 | Palmer | 224/507 |
| 4,406,384 A | * | 9/1983 | Schantz | 224/493 |
| 4,645,084 A | * | 2/1987 | Deike | 212/271 |
| 4,662,647 A | * | 5/1987 | Calvert | 280/490.1 |
| 4,951,991 A | * | 8/1990 | Haigler | 296/26.09 |
| 5,038,983 A | * | 8/1991 | Tomososki | 224/521 |
| 5,219,105 A | * | 6/1993 | Kravitz | 224/511 |
| 5,344,175 A | * | 9/1994 | Speer | 280/506 |
| 5,593,139 A | * | 1/1997 | Julian | 254/325 |
| 5,615,904 A | * | 4/1997 | Van Dusen et al. | 280/506 |
| 5,695,103 A | * | 12/1997 | Duvernay et al. | 224/532 |
| 5,752,636 A | * | 5/1998 | Manley | 224/405 |
| 6,039,228 A | * | 3/2000 | Stein et al. | 224/532 |
| 6,336,580 B1 | * | 1/2002 | Allen et al. | 224/532 |
| 6,588,636 B1 | * | 7/2003 | Young et al. | 224/521 |
| 6,698,810 B1 | * | 3/2004 | Lane | 296/3 |
| 6,773,200 B2 | * | 8/2004 | Cole | 403/378 |
| 6,834,879 B1 | * | 12/2004 | Lorman | 280/506 |
| 6,902,182 B1 | * | 6/2005 | Kamunen | 280/493 |
| 6,951,287 B1 | * | 10/2005 | Randazzo | 211/17 |

(Continued)

*Primary Examiner*—Lesley D Morris
*Assistant Examiner*—Daniel Yeagley
(74) *Attorney, Agent, or Firm*—Law Offices of Thomas E. Schatzel, A Prov. Corp.

(57) ABSTRACT

A hitch adapter comprises an inner square tube member for receiving Class-II 1.25" drawbars and an outer U-channel member for plugging into a Class-III 2" receiver. The inner square tube and outer U-channel members are welded together such that one wall of the inner square tube bridges the gap between the distal edges on opposite legs of the outer U-channel. One such leg of the outer U-channel is longer than the other and is positioned and aligned to protrude about $\frac{1}{16}$" beyond the adjacent outer corner of the inner square tube member. Such protrusion nests into the respective inside corner of the particular Class-III 2" receiver it is mated to. The protrusion provides a camming action to take up any looseness and slack, and thereby eliminate wobble and rattle when installed by a user. A series of hitch pin holes allows a threaded hitch pin to pass through the adapter, a Class-II 1.25" drawbar and a Class-III 2" receiver. Threads inside the Class-II 1.25" drawbar engage the hitch pin threads and provide the user a way to secure the whole assembly.

9 Claims, 5 Drawing Sheets

U.S. PATENT DOCUMENTS

| | | | |
|---|---|---|---|
| 7,004,491 B1 * | 2/2006 | Allsop et al. | 280/506 |
| 7,097,408 B2 * | 8/2006 | Paxton | 414/462 |
| 7,338,065 B1 * | 3/2008 | Clausen | 280/507 |
| 7,536,820 B2 * | 5/2009 | Wade et al. | 42/94 |
| 2002/0125284 A1 * | 9/2002 | Cook | 224/560 |
| 2005/0236811 A1 * | 10/2005 | Williams | 280/507 |
| 2007/0262563 A1 * | 11/2007 | Williams | 280/506 |

\* cited by examiner

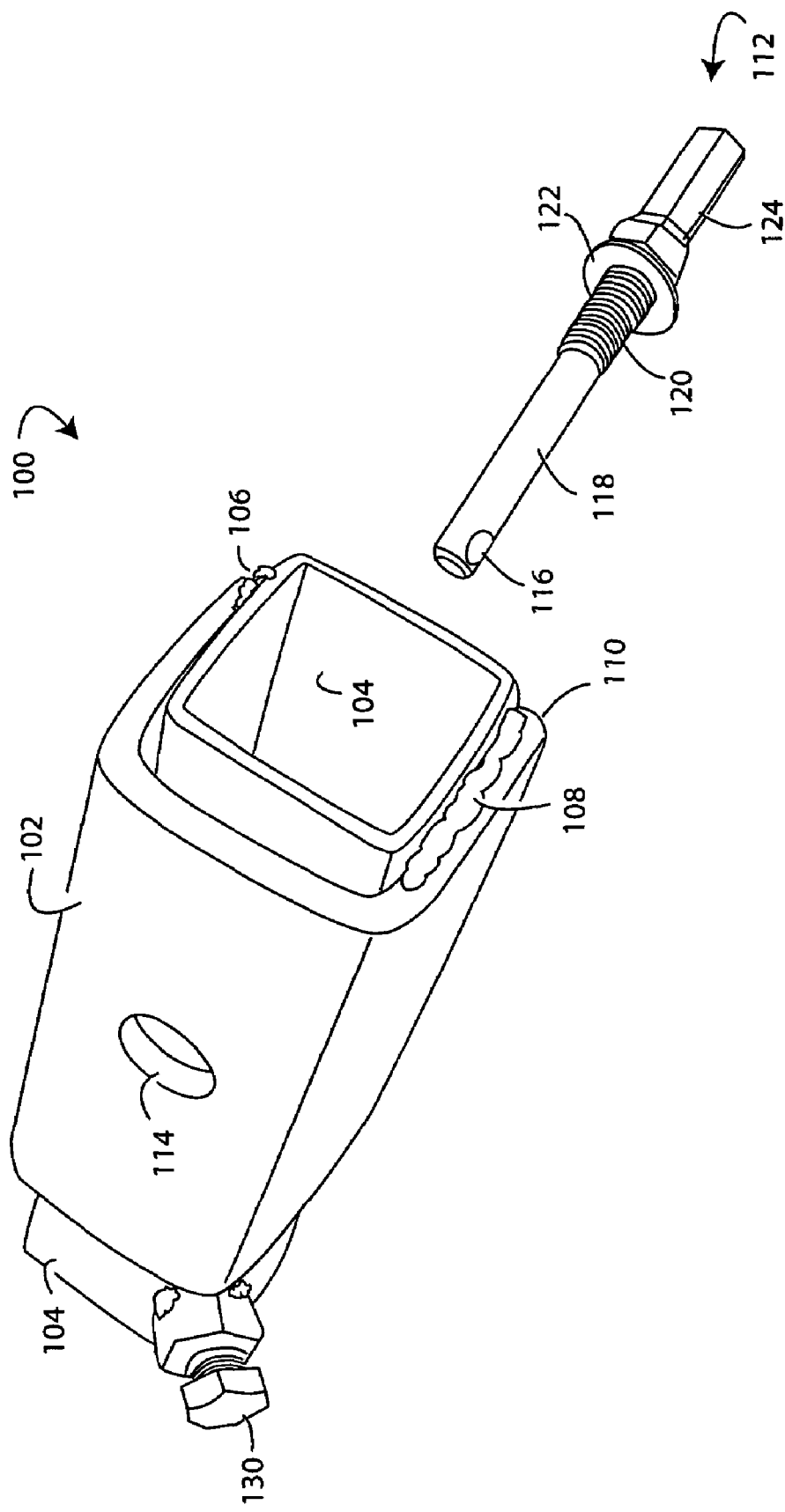

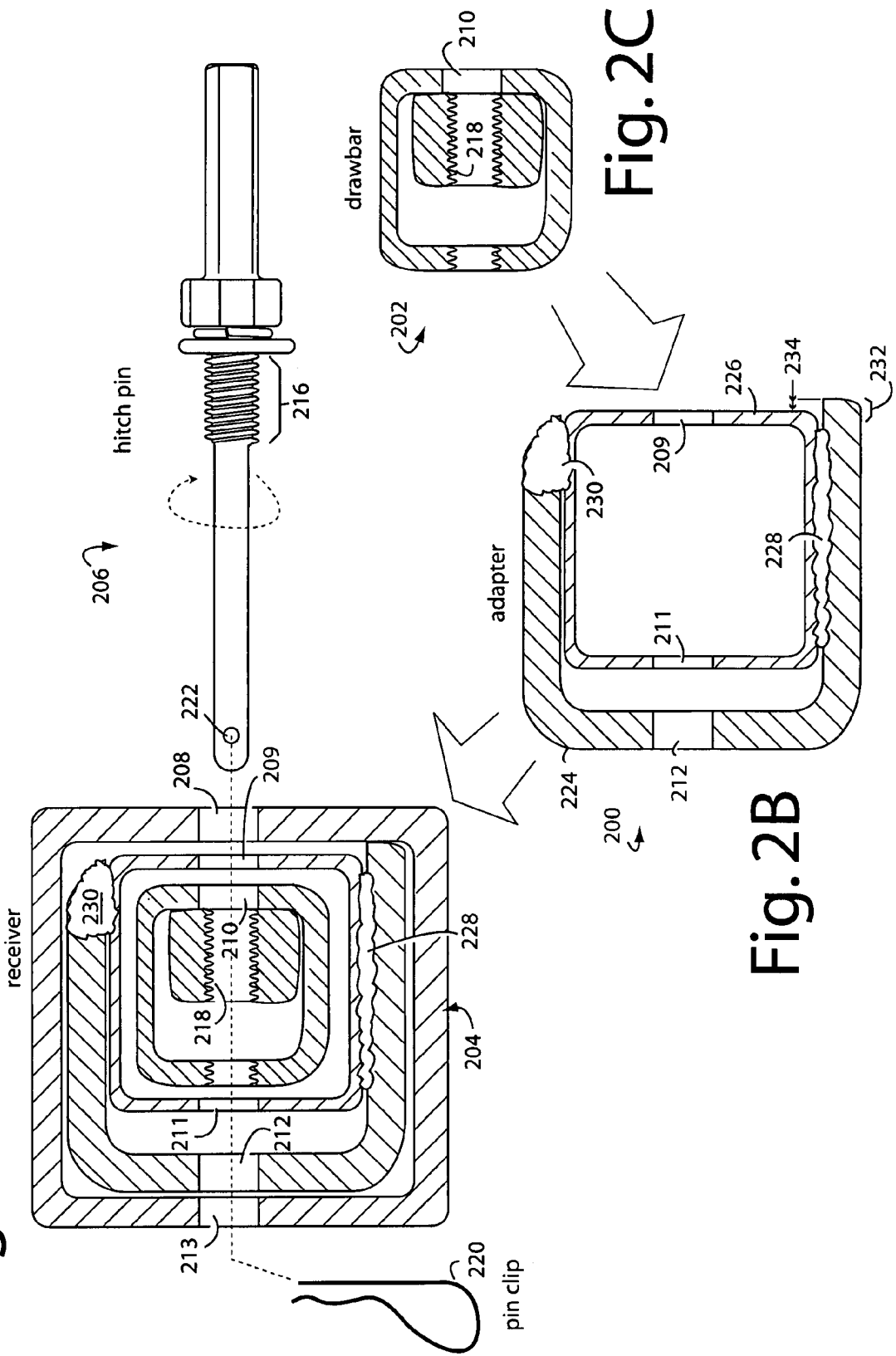

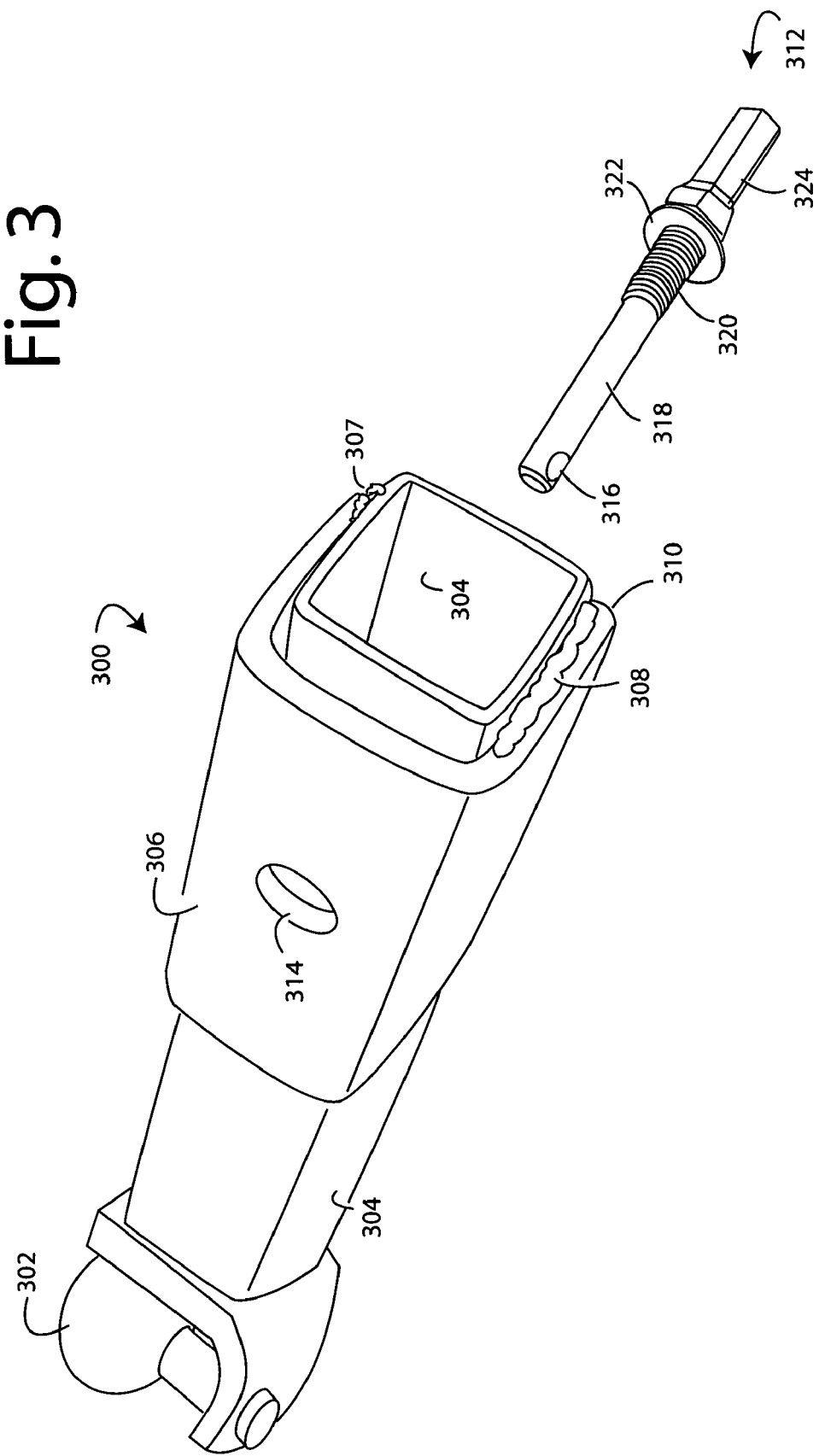

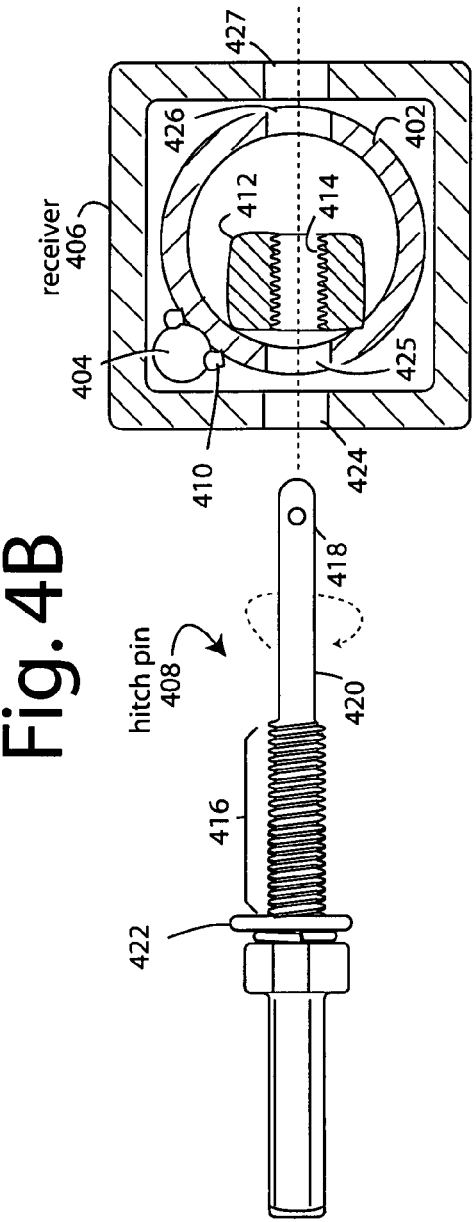
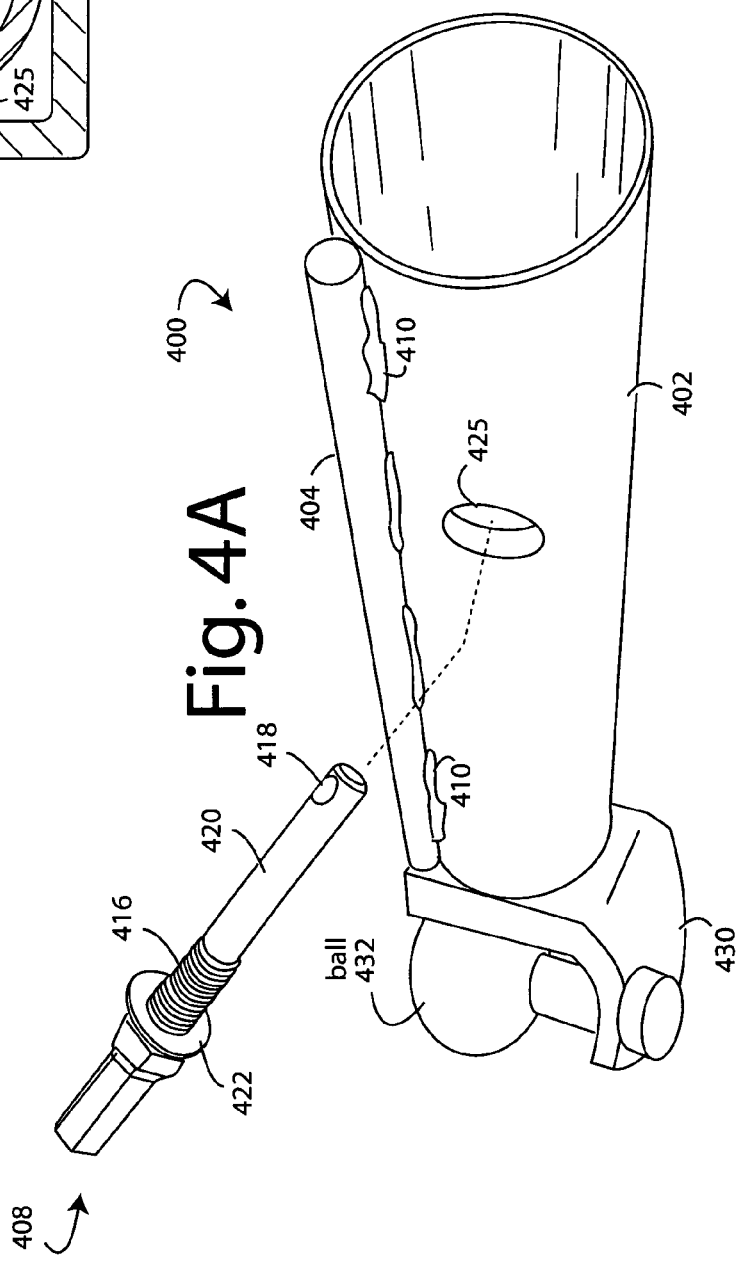
Fig. 4B
Fig. 4A

CAM ACTION TIGHTENING RECEIVER HITCH ASSEMBLY

1. FIELD OF THE INVENTION

The present invention relates to adapters to fit Class II hitch accessories in Class III receivers, and more particularly to devices that take up the slack and wobble in such adapters so they will be suitable to carry bicycles on receiver carriers.

2. DESCRIPTION OF THE PRIOR ART

Two of the most popular towing hitches in widespread use on cars and highways in America are the so-called Class-II and Class-III systems. Both are very familiar to the average American, the Class-II system uses drawbars with 1.25" square cross sections that plug into matching receivers and that are secured with a pin. Such are rated for no more than 3500 pounds gross towing weight and 300 pounds tongue weight. The Class-III system ups those ratings to 5000 pounds gross towing weight, and 500 pounds tongue weight. Class-III drawbars are 2.0" square in cross section and the receivers are sized to match. What the vehicle is actually rated for can be less than what the drawbar and receiver are rated.

Having two differently sized systems in widespread use, of course, causes fitment problems. A large number of accessories have become available for both Class-II and Class-III receivers, e.g., everything from bicycle carriers, to BBQ's for tail-gate parties, utility load carriers, workman steps, and even license plate holders. In particular, it would be desirable for bicycle racks with Class-II 1.25" drawbars to fit cars and trucks equipped with either Class-II receivers or the 2.0" Class-III receivers.

Many prior art adapters and converters are available, but they universally provide sloppy fits between parts that can rattle and allow the accessories to wobble and move. A large bicycle rack with a long support arm can move quite a bit given the leverage of the arm and the typical slack in parts fitting. Sometimes this movement can allow the equipment being carried to repeatedly bang into the vehicle and damage the vehicle or the equipment being carried.

Some prior art adapters have attempted various kinds of wedges and bolt arrangement to take up slack, but these often require tools and skills not available, and the nature of the mating parts causes the accessories to angle inappropriately away from normal. Furthermore, prior art adapters have not provided multi-axis tightening and stabilization.

SUMMARY OF THE INVENTION

Briefly, a hitch adapter embodiment of the present invention comprises an inner square tube member for receiving Class-II 1.25" drawbars and an outer U-channel member for plugging into a Class-III 2" receiver. An outside corner of the inner square tube includes a welded-on nut about 0.75" from the end, and a bolt that is screwed down to press a Class-II 1.25" drawbar snugly into the opposite inside corner. The inner square tube and outer U-channel members are welded together such that one wall of the inner square tube bridges the gap between the distal edges on opposite legs of the outer U-channel. One such leg of the outer U-channel is longer than the other and is positioned and aligned to protrude about 1/16" beyond the adjacent outer corner of the inner square tube member. Such protrusion nests into the respective inside corner of the particular Class-III 2" receiver it is mated to. The protrusion provides a camming action to take up any looseness and slack in all axes, and thereby eliminate wobble and rattle when installed by a user. A series of hitch pin holes allows a threaded hitch pin to pass through the adapter, a Class-II 1.25" drawbar and a Class-III 2" receiver. Threads inside the Class-II 1.25" drawbar engage the hitch pin threads and provide the user a way to secure the whole assembly. Other securing pin configurations possible use shoulder bolts, or other devices, to press the Class-II 1.25" drawbar hard against the inner sidewalls of the square tube.

An advantage of the present invention is that a simple, cost effective, and easy-to-manufacture device is provided to eliminate undesired movement between a hitch accessory insert shank and its mating receiver hitch tube and thereby eliminate the wobble, wear, and noise caused by any looseness in the assembly.

A further advantage of the present invention is that a simple device is provided that will work with different sizes of receiver hitches.

It is another object of the present invention to provide a simple adapter that can be retrofit to existing 1.25" hitch size accessories so they can be used in 2" receivers, and provide a threaded pin for securing the accessory in the hitch.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a perspective view diagram of a hitch adapter embodiment of the present invention;

FIGS. 2A-2C are cross-sectional views of a hitch adapter embodiment of the present invention, with FIG. 2A showing the adapter installed between a Class-III type 2" receiver and a Class-II type 1.25" accessory shank and a threaded hitch pin to secure it all. FIG. 2B shows just the adapter, and FIG. 2C shows just the accessory shank;

FIG. 3 is a perspective view diagram of a ball mount accessory assembly embodiment of the present invention;

Figure 4C:
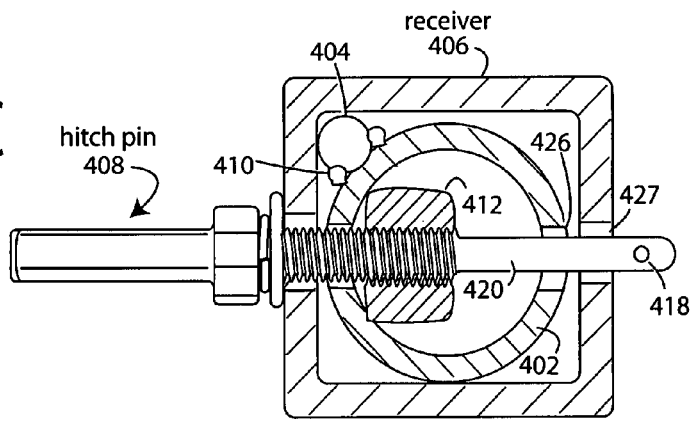
Figure 5A:
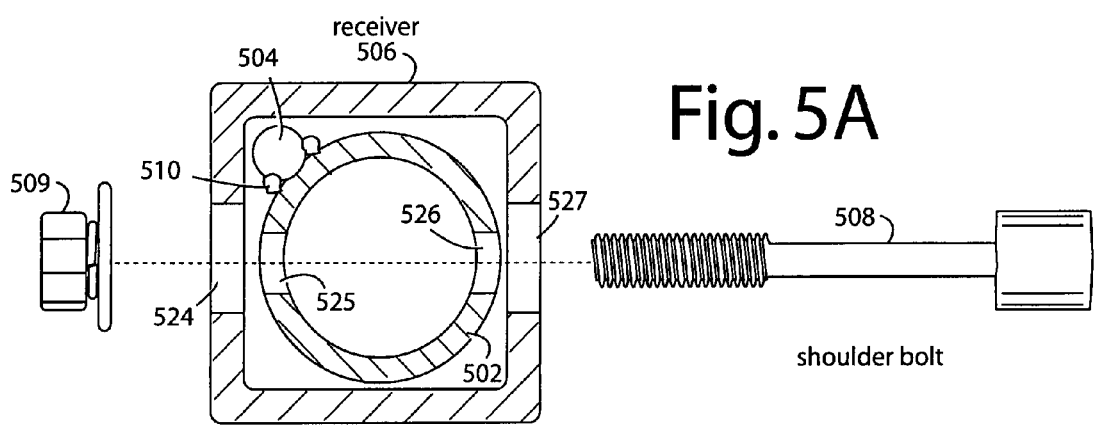
Figure 5B:
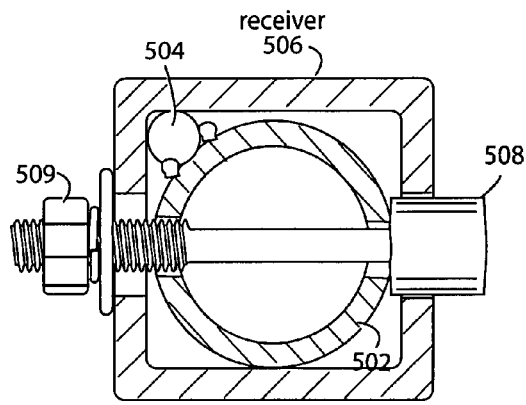

FIG. 4A is a perspective view diagram and FIGS. 4B and 4C are a cross-sectional view diagrams of a round drawbar embodiment of the present invention. The basic construction uses a round steel tubing with ridge of welded rod sized to fit a receiver. The whole will "cam" together tightly when a threaded hitch pin is installed, as is shown in FIG. 4C; and FIG. 5A is a perspective view diagram and FIG. 5B is a cross-sectional view diagrams of a round drawbar embodiment of the present invention like that of FIGS. 4A-4C, but using a shoulder bolt instead of a threaded hitch pin. The loose parts will "cam" together tightly when the shoulder bolt is passed through and the nut on the opposite side is tightened. This embodiment does not require the threaded insert disposed inside the drawbar.

DETAILED DESCRIPTION OF THE PREFERRED EMBODIMENT

FIG. 1 represents a hitch adapter embodiment of the present invention, and is referred to herein by the general reference numeral 100. The hitch adapter 100 allows a Class-II 1.25" drawbar to be secured within a Class-III 2" receiver. It comprises a U-channel 102 of mild steel 0.25" thick and typically formed with outside cross-section of just under 2" square and a length of 4.5". The U-channel 102 is welded to an inner square tube 104 by short welds represented by welds 106 and 108. Importantly, a longer leg 110 of U-channel 102 is formed and welded such that it protrudes about 0.0675"

along its longitudinal length past the adjacent outside corner of inner square tube 104. This detail is shown more fully in FIG. 2.

The most common receiver pins are ½" and ⅝" in diameter. Class-II receiver hitches have 1¼" receptacles and use ½" pins. Class-III and Class-IV receiver hitches have 2" receptacles and use ⅝" pins.

A hitch pin 112, or other type fastener capable of snugging together the parts, is used to secure both a Class-II 1.25" drawbar and the hitch adapter 100 inside a Class-III 2" receiver. The hitch pin 112 is passed through side holes 114 and a retaining clip is snapped into a retaining clip hole 116. Overall, hitch pin 112 is about 5.5" long, and has a non-threaded shaft 118 about 2.25" long and 0.39" in diameter. A machine thread 120 is about 1.25" long and has an SAE 1/2-13 thread. It is intended to screw into a similarly threaded portion inside the Class-II 1.25" drawbar and thus be able to bring it and hitch adapter 100 up tight against the inside of the Class-III 2" receiver. A ½" washer and lock-washer 122 and hex head 124 provide a way for the user to tighten and secure the assembly to a vehicle. The adapter 100 includes a corner set bolt 130 to snug the Class-II 1.25" drawbar inside inner square tube 104. The corner set bolt 130 is preferred because it works best, but a socket head set screw on the adapter's top or a bolt through the adapter's side could also be used to snug the drawbar inside the square tube.

When hitch pin 112 is tightened in place, longer leg 110 will engage the inside corner of the Class-III 2" receiver. A critical aspect of the present invention is that it is this very mechanism that is responsible for eliminating all the wobble and rattle between parts that would otherwise occur. So the setting and alignment of the protrusion of longer leg 110 and the dressing and grinding of welds 106 and 108 should be done with care and precision during the manufacturing.

FIG. 2 represents a hitch adapter embodiment of the present invention, and is referred to herein by the general reference numeral 200. The hitch adapter 200 allows a Class-II 1.25" drawbar 202 to be secured within a Class-III 2" receiver 204. When a user puts all the pieces 200, 202, and 204 together and aligns them, a hitch pin 206 is inserted through 0.625" diameter holes 208-213 and a SAE 1/2-13 bolt thread 216 is threaded and tighten inside an SAE 1/2-13 nut thread 218. A retaining clip 220 is used as a keeper by snapping it into a 0.2188" diameter retaining clip hole 222. The hitch pin 206 can be made of stainless steel.

Hitch adapter 200 comprises a U-channel 224 of mild steel 0.25" thick and typically formed with outside cross-section of just under 2" square and a length of 4.5". The U-channel 224 is welded to an inner square tube 226 by welds 228 and 230. The inner square tube 226 is also made of steel with walls about 0.095" thick, and has inside dimensions of 1.31" square.

Importantly, a longer leg of U-channel 224 is formed and welded such that it forms a protrusion 232. In FIG. 2, a dimension 234 represents a cantilever of about 0.0675" along the longitudinal length beyond the adjacent outside corner of inner square tube 226.

FIG. 3 represents a ball mount accessory assembly embodiment of the present invention, and is referred to herein by the general reference numeral 300. The ball mount accessory assembly fits into a Class-III 2" receiver. It comprises a hitch ball 302, an inner square tube section 304, and a U-channel 306. Such U-channel 306 can be made of mild steel 0.25" thick, and is typically formed with outside cross-section of just under 2" square and a length of 4.5". The U-channel 306 is welded to the inner square tube 304 by short welds represented by welds 307 and 308. A longer leg 310 of U-channel 306 is formed and welded such that it protrudes about 0.0675" along its longitudinal length past the adjacent outside corner of inner square tube 304. This detail is similar to that shown more fully in FIG. 2.

A hitch pin 312 is used to secure the assembly 300 inside a Class-III 2" receiver. The hitch pin 312 is passed on the side through threaded hole 314. A retaining clip is snapped into a retaining clip hole 316. Overall, hitch pin 312 is about 5.5" long, and has a non-threaded shaft 318 about 2.25" long and 0.39" in diameter. A machine thread 320 is about 1.25" long and has an SAE 1/2-13 thread. It is intended to screw into a similarly threaded portion inside the inner square tube 304 and thus be able to bring assembly 300 up tight against the inside of the Class-III 2" receiver. A ½" washer and lock-washer 322 and hex head 324 provide a way for the user to tighten and secure the assembly to a vehicle.

When hitch pin 312 is tightened in place, longer leg 310 will engage the inside corner of the Class-III 2" receiver. A critical aspect of the present invention is that it is this mechanism that will eliminate wobbling and rattling in any direction between parts that would otherwise occur. The setting and alignment of the protrusion of longer leg 310 and the dressing and grinding of welds 307 and 308 should be done with care and precision during the manufacturing.

FIGS. 4A-4C show a drawbar embodiment of the present invention, that is referred to herein by the general reference numeral 400. Drawbar 400 can be constructed to fit Class-II type 1.25" receivers and Class-III type 2" receivers by using either a 1.25" or 2" outside diameter steel tubing for a shank 402. A ridge 404 of rod is sized to fit a corresponding hitch receiver 406 and "cam" in tightly when a threaded hitch pin 408 is installed, as is shown in FIG. 4C.

Ridge 404 is typically attached to shank 402 by welds 410 along a 45-degree radial longitudinal line on the outside surface of the cylinder of the round steel tube 402. Such 45-degree radial measurement is only approximate, and the ridge 404 should be able to fully nest in a near inside corner of receiver 406 next to where the hitch pin 408 will be introduced.

A threaded insert 412 has, for example, SAE 1/2-13 threads 414 to match a bolt thread 416 on the hitch pin 408. A retainer clip hole 418 is used for a retaining clip, e.g., a safety-spring type or cotter. A shaft 420 is sized to fit the class of receiver being used. A washer and lock washer pair 422 help keep the hitch pin 408 in tight. Holes 424-427 are aligned and provided for hitch pin 408. A ball support 430 is welded to one end of the steel tube shank 402, and a 1⅞" or 2" ball 432 is bolted onto it.

FIGS. 5A and 5B show a drawbar assembly embodiment of the present invention that is referred to herein by the general reference numeral 500. A shank 502 is similar to shank 402, but without threaded insert 412. Shank 502 can be constructed to fit Class-II type 1.25" receivers and Class-III type 2" receivers by using either a 1.25" or 2" outside diameter steel tubing. A ridge 504 of rod is sized to fit a corresponding hitch receiver 506 and "cam" in tightly when a shoulder bolt 508 is installed, as in FIG. 5B. Ridge 504 is typically attached to shank 502 by welds 510 along a 45-degree radial longitudinal line on the outside surface of the cylinder of the round steel tube 502. Such 45-degree radial measurement is only approximate.

Holes 524-527 are aligned and provided for the shoulder bolt 508 to pass through. Holes 524 and 527 will typically be ⅝" diameter, and holes 525 and 526 will be ½" diameter. The head of shoulder bolt 508 should be able to pass through hole 527, but not hole 526. FIG. 5B shows how the ridge 504 should be able to fully nest in a near inside corner of receiver 506 next to where a shoulder bolt nut 509 will be tightened.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A hitch adapter system, comprising:
   an inner square tube member for receiving Class-II type 1.25" accessories;
   an outer U-channel member for plugging into a Class-III type 2" receiver, wherein the inner square tube and outer U-channel members are welded together such that one wall of the inner square tube bridges the gap between the distal edges on opposite legs of the outer U-channel;
   a protrusion disposed on a longer leg of the outer U-channel and that is positioned and aligned to cantilever out about 1/16" beyond an adjacent outer corner of the inner square tube member, wherein the protrusion provides a camming action to take up any looseness and slack, and to eliminate wobble and rattle when installed by a user;
   a series of hitch pin holes providing for a snug fastener to pass through a hitch adapter, a Class-II 1.25" accessory, and a Class-III 2" receiver.

2. The hitch adapter system of claim 1, further comprising:
   a set bolt disposed in an outside corner of the inner square tube and able to be screwed in by a user such that it can press a shank of said Class-II type 1.25" accessories tight into an opposite corner.

3. The hitch adapter system of claim 1, further comprising:
   a shoulder bolt for use as said snug fastener able to pull a shank of said Class-II type 1.25" accessories laterally inside said Class-III type 2" receiver to eliminate wobble and rattle.

4. The hitch adapter system of claim 1, further comprising:
   a Class-II type 1.25" accessory shank;
   a threaded hitch pin for passing through the series of hitch pin holes and used as said snug fastener; and
   a machine thread disposed inside the accessory shank for engaging the threaded hitch pin and providing a device to further take up any looseness and slack, and to eliminate wobble and rattle when installed by a user.

5. The hitch adapter system of claim 4, wherein:
   the threaded hitch pin includes a hole at an end for a retaining clip, a smooth shaft, and a threaded bolt shoulder.

6. A ball mount accessory assembly, comprising:
   an inner square tube member;
   a trailer hitch ball mount attached to one end of the inner square tube member;
   an outer U-channel member sized to be able to plug into a Class-III type 2" receiver, wherein the inner square tube and outer U-channel members are welded together such that one wall of the inner square tube bridges the gap between the distal edges on opposite legs of the outer U-channel;
   a protrusion disposed on a longer leg of the outer U-channel and that is positioned and aligned to cantilever out about 1/16" beyond an adjacent outer corner of the inner square tube member, wherein the protrusion provides a camming action to take up any looseness and slack, and to eliminate wobble and rattle when installed by a user;
   a series of hitch pin holes providing for a threaded hitch pin to pass through a ball mount accessory assembly and a Class-III 2" receiver.

7. The ball mount accessory assembly of claim 6, further comprising:
   a threaded hitch pin for passing through the series of hitch pin holes; and
   a machine thread disposed inside the inner square tube member for engaging said threaded hitch pin and providing a device to take up any looseness and slack, and to eliminate wobble and rattle when installed by a user.

8. The ball mount accessory assembly of claim 6, further comprising:
   a shoulder bolt for passing through the series of hitch pin holes and providing a snug fastener device to take up looseness and slack to eliminate wobble and rattle between parts of the assembled whole.

9. The ball mount accessory assembly of claim 6, wherein:
   the threaded hitch pin includes a hole at an end for a retaining clip, a smooth shaft, and a threaded bolt shoulder.

\* \* \* \* \*